United States Patent [19]

Guichard

[11] 4,115,701
[45] Sep. 19, 1978

[54] COAXIAL REFLEX PHOTOELECTRIC SCANNER

[75] Inventor: Robert C. Guichard, Normal, Ill.

[73] Assignee: General Electric Company, New York, N.Y.

[21] Appl. No.: 749,187

[22] Filed: Dec. 9, 1976

[51] Int. Cl.² ............................................. H01L 9/00
[52] U.S. Cl. .................................. 250/552; 250/216; 250/353
[58] Field of Search ............... 250/216, 353, 552, 553, 250/563, 568, 574; 350/211; 356/186

[56] References Cited

U.S. PATENT DOCUMENTS

| 3,761,184 | 9/1973 | McLaughlin | 250/216 X |
| 3,774,039 | 11/1973 | Price | 250/552 |
| 3,996,476 | 12/1976 | Lazzara | 250/574 X |

FOREIGN PATENT DOCUMENTS 940,839 11/1963 United Kingdom ................ 250/353 X Primary Examiner—Lawrence J. Dahl
Attorney, Agent, or Firm—Stephen A. Young; F. L. Neuhauser

[57] ABSTRACT

A coaxial reflex photoelectric scanner comprising first and second lenses, a photoelectric light source and a photodetection device, all mounted within a housing in coaxial relationship with one another. The photodetection device is positioned between the light source and the second lens, wherein the second lens is positioned between the photodetection device and the first lens. The second lens is so positioned that the photodetection device absorbs an optimum quantity of light energy that is reflected back from an object and through the first and second lenses.

6 Claims, 4 Drawing Figures

COAXIAL REFLEX PHOTOELECTRIC SCANNER

BACKGROUND OF THE INVENTION

1. Field of the Invention

This invention relates to photoelectric reflex optical systems, and, in particular, to coaxial reflected energy photoelectric scanners.

2. Description of the Prior Art

In reflex optical systems of the type described in U.S. Pat. No. 3,238,373, a photodetection device is located behind a light source. Under these circumstances, the amount of reflected energy absorbed by the photodetection device would be small in comparison to the total amount of reflected energy existing in such a system. Thus, the efficiency of this type of reflected photoelectric energy system is inherently very low.

In another type of reflex photoelectric scanning system described in reissue U.S. Pat. No. 26,915, a light source is placed at the focal point of a main lens, wherein a beam of collimated parallel light rays is generated out from the main lens. A photodetecting device and an auxiliary lens is positioned within this beam of light for detecting reflected energy. Inasmuch as the photodetection device and associated lens must be small in order not to obstruct the main portion of the light energy emanating from the main lens, the photodetection device and associated lens will be positioned to receive only a small amount of reflected energy from an object.

OBJECTS OF THE INVENTION

It is therefore an object of this invention to provide an improved coaxial reflex photoelectric scanner, wherein the photodetection detection device used within the scanner can be optimally positioned to receive the maximum amount of reflected energy.

It is another object of this invention to provide for an improved coaxial reflex photoelectric scanner which has the ability to generate a greater amount of infrared light energy from a solid state photoelectric device than previous systems that utilized solid state photoelectric devices.

It is a further object of this invention to provide for an improved coaxial reflex scanner which has the capability of adjusting the position of the photodetection device used therein for optimum absorption of reflected energy.

It is a still further object of this invention to provide for an improved coaxial reflex photoelectric scanner that utilizes a lens which also acts as a filter for passing only infrared radiation.

This and other objects of the invention will be pointed out hereinafter.

SUMMARY OF THE INVENTION

According to a broad aspect of the invention, there is provided a coaxial reflex photoelectric scanner. The scanner is comprised of a housing and a main lens mounted within the housing. Also provided is a solid state photoelectric light source and photodetection device. The photodetection device is positioned between the light source and the main lens at a point of optimum absorption of light energy which is reflected back from an object and through the main lens. The light source is thermally connected to a heat sink in order to enable it to be used at increased light emitting levels. A second lens is positioned within the housing between the first lens and the photodetection device in coaxial alignment with the photodetection device and the light source. Means is provided for adjusting the distance between the second lens and the photodetection device to maximize the absorption of reflected light energy which is received by the photodetection device. The first lens can be comprised of a molded polycarbonate plastic material which also serves as a filter to pass only infrared radiation.

DESCRIPTION OF THE PREFERRED EMBODIMENTS

Figure 1:
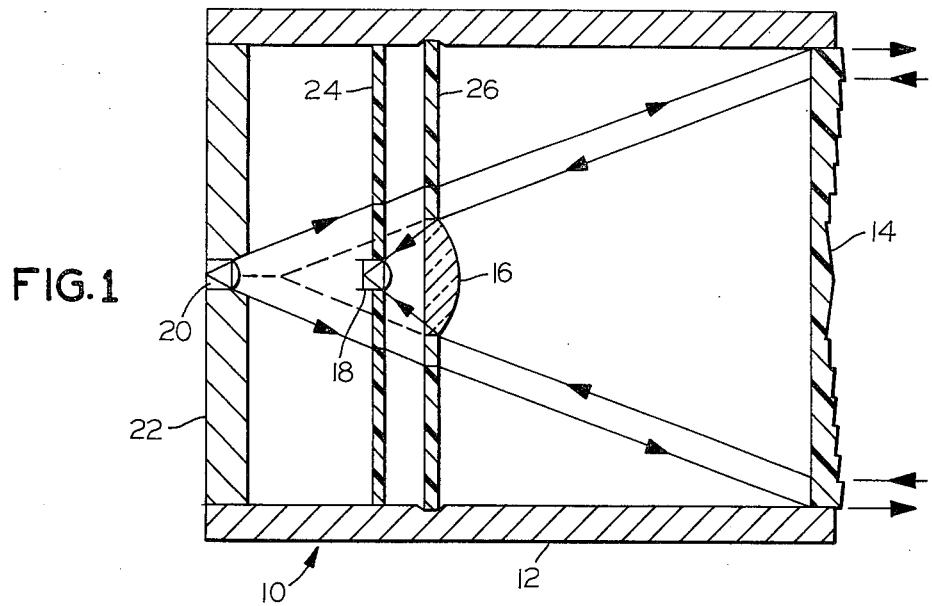
FIG. 1 is a sectional view of one embodiment of a coaxial reflex photoelectric scanner in accordance with the invention.

Referring to FIG. 1, one embodiment of the invention will now be explained. As shown in FIG. 1, a coaxial reflex photoelectric scanner 10 is comprised of a housing 12, a first lens 14, a second lens 16, a photodetection device 18, a photoelectric light source 20 such as a solid state light emitting diode, a heat sink 22 and plastic supporting discs 24 and 26.

Housing 12 can be a cylindrically shaped barrel made of a structurally suitable metal or opaque plastic such as a polycarbonate plastic, i.e., Lexan plastic made by the General Electric Company (Lexan being a trdemark of the General Electric Company). Lens 14 can be comprised of a Lexan polycarbonate material which is molded, using standard molding techniques, into a lens that has a surface consisting of a concentric series of simple lens sections so that a thin lens with a short focal length and large diameter is possible. Such a lens is commonly known as a fresnel lens.

In addition to operating as a lens, lens 14 can also be made to act as a filter for passing infrared radiation while blocking almost all visible light. This is accomplished by immersing fresnel lens 14 into a trichlorethylene solution which has dissolved therein industrial dyes (commonly available from the Verona Division of the Baychem Corporation) in proportions of one gram of industrial dye violet B to 0.1 grams of industrial dye yellow 3G to 0.3 grams of industrial dye red G to 0.1 grams of industrial dye orange 3G. The trichlorethylene solvent softens the surface of the plastic lens and allows the dyes to penetrate through the surface to a depth of approximately 0.002 inches. While lens 14 has been described as a fresnel lens, it should be understood that other types of lenses, such as a plano-convex glass lens, can also be used.

Support discs 24 and 26 can be comprised of a clear acrylic plastic or a polycarbonate plastic material such as Lexan plastic. Supporting discs 24 and 26 have respective holes centrally located therein for receiving and having mounted thereto respective photodetection device 18 and lens 16. While lens 16 is shown as a plano-convex glass lens, it should be noted that lens 16 could also be comprised of a molded plastic fresnel lens of the same type as is lens 14. Photodetection device 18 can be a standard silicon phototransistor, or any other type of light activated photodetection device, which is electrically connected to standard amplifying and gaging or measuring means (not shown). Photoelectric light source 20 can be comprised of any standard solid state photoelectric light source, such as commonly available solid state light emitting diodes which emit infrared radiation when an electrical current is passed therethrough. Photoelectric light source 20 is electrically connected to a source of electric current (not shown), and is mounted in an aperture in heat sink 22. By connecting light source 20 in a thermally conductive relationship with heat sink 22, more electric current can be passed through the light source than normally could be passed therethrough without the device being destroyed. This enables photoelectric light source 20 to be operated at higher light emitting energy levels than was previously experienced in coaxial reflex photoelectric scanners. Note that lens 14 and discs 24 and 26 and heat sink 22 can be mounted within cylindrical housing 12 using standard mounting and fastening techniques which are well known to one ordinarily skilled in the art. Alternatively, it should be noted that under circumstances where discs 24 and 26 and lens 14 are made of the same material as housing 12, it is possible that these pieces can be molded into a single unitary structure. In the structure described with regard to FIG. 1, photoelectric light source 20, photodetection device 18 and lenses 14 and 16 are of course fixed, and aligned in coaxial relationship with one another.

By way of example, if lens 14 is 2 inches in diameter, lens 16 is 0.375 inches in diameter and photodevices 18 and 20 are respectively 0.25 inches in diameter and, at the same time, if the distance between photodevices 18 and 20 is 0.25 inches, the distance between lenses 14 and 16 is 1.25 inches and the distance between lens 16 and device 18 is 0.35 inches, while the focal length of lens 14 is 1.75 inches, then when electric power is applied to photoelectric light source 20, the infrared radiation which is emitted therefrom produces collimated parallel beams of light from 90% of the area of fresnel lens 14. Under these circumstances, after the emitted light from the photoelectric scanner collides with a target, it is reflected back through lens 14, and then through lens 16 so that an optimum amount of reflected light energy is received by photodetection device 18. This received energy is amplified and measured using standard electronic techniques known to one ordinarily skilled in the art.

Figure 2:
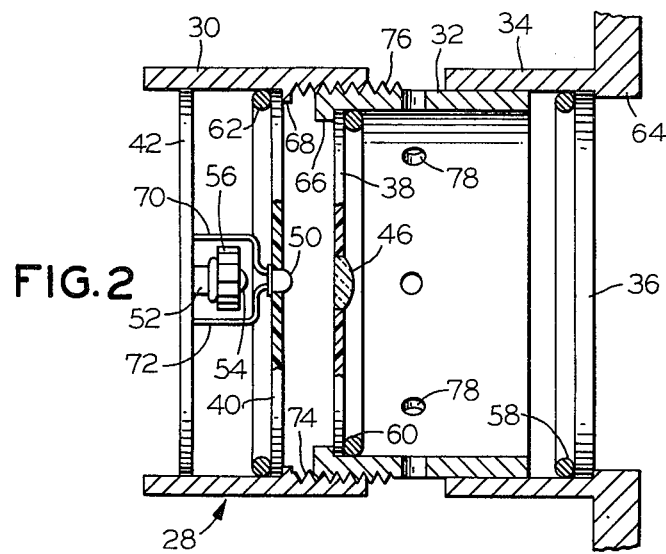
FIG. 2 is a cross-sectional view of another embodiment of a coaxial reflex photoelectric scanner in accordance with the teachings of the invention.
Figure 3:
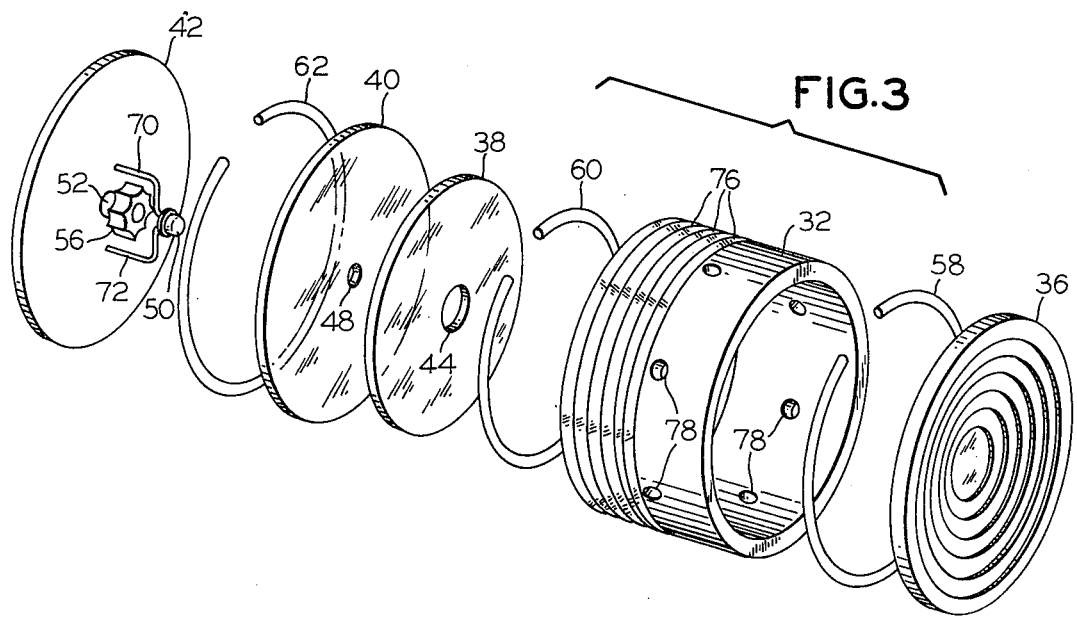
FIG. 3 is an exploded perspective view of a coaxial reflex energy system shown in FIG. 2.

In another embodiment of the invention, a barrel shaped housing for a photoelectric scanner 28 is comprised of first, second and third housing sections 30, 32 and 34 as shown in FIG. 2. Referring now to FIGS. 2 and 3, the scanner further includes a lens 36, supporting disc shaped members 38 and 40, and a disc shaped printed circuit board 42. Member 38 has a centrally located aperture 44 therein for supporting a plano-convex lens 46 (shown in FIG. 2). Similarly, disc shaped supporting member 40 also has a centrally located aperture 48 therein for receiving and supporting a photodetection device 50 (shown in FIG. 2). Centrally located and mounted on printed circuit board 42 is a socket 52 for receiving and holding a photoelectric light source 54 (shown in FIG. 2). Also, mounted on socket 52, and thermally coupled to light source 54, is a heat sink 56. Also included within scanner 28 are respective O-rings 58, 60 and 62. It can be assumed that lenses 36 and 46, discs 38 and 40 and photoelectric devices 50 and 54 are of the same type as respective lenses 14 and 16, discs 26 and 24 and photoelectric devices 18 and 20 shown in FIG. 1, and that housing sections 30, 32 and 34 are made of the same material as is housing 12 shown in FIG. 1. Furthermore, these devices in the second embodiment can be of the same size and have the same coaxial dimensional relation as their counterpart elements shown in FIG. 1.

The distinction between the first and second embodiments are as follows. In FIGS. 2 and 3, O-ring 58 is used to hold lens 36 in a fixed position against an inner flange portion 64 of housing section 34, while O-ring 60 is used to hold disc 38 in a fixed position against a flanged portion 66 of housing section 32, and O-ring 62 is used to hold disc 40 in a fixed position against a flanged portion 68 of housing section 30. Additionally, instead of mounting a disc shaped heat sink 22 within housing 12 as shown in FIG. 1, printed circuit board 42 is fixed within housing section 30 using standard fastening techniques, and can include thereon the necessary electrical circuits for supplying power to light source 54 and for providing means for amplifying and measuring the infrared light energy received by photoelectric device 50. Alternatively, board 42 can be a terminal for making electrical connection to an externally located power means for light source 54 and amplifying and measuring means for the infrared energy. As illustrated in FIGS. 2 and 3, photoelectric device 50 has electrically conductive leads 70 and 72 extending therefrom and to appropriate terminals or circuit means (not shown) on board 42. Still further, housing sections 30 and 32 provide a means for adjusting the distance between lens 46 and photodetection device 50 to maximize the absorption of reflected infrared light energy which is received by the photodetection device. This adjusting means is comprised of housing sections 30 and 32 having respective threaded portions 74 and 76 in mating engagement with one another such that as housing section 30 is rotated with respect to housing section 32, the distance between photodetection device 50 and lens 46 changes. In order to facilitate the rotation of housing section 30 with respect to housing section 32, housing section 32 has therein a series of holes 78 therethrough for receiving a suitable spindly shaped object within any of these holes so that section 32 can be held stationary while section 30 is rotated. Inasmuch as the lenses and photoelectric devices shown in FIGS. 2 and 3 are in coaxial relationship with one another, and can be of the same dimension and have the same spatial relationship with respect to one another as their counterparts shown in FIG. 1, the operation of the second embodiment is substantially the same as the previously described operation of the first embodiment.

Although this invention has been described with reference to specific embodiments thereof, numerous modifications are possible without departing from the invention, and it is desirable to cover all modifications falling within the spirit and scope of this invention.

What I claim as new and desire to secure by Letters Patent of the United States is:

1. A coaxial reflex photoelectric scanner comprising:
   (a) a housing;
   (b) a first lens mounted with said housing;
   (c) a photoelectric light source mounted in said housing to radiate toward one side of said first lens and produce parallel rays of light from the other side thereof;
   (d) a second lens positioned within said housing in coaxial alignment with and between said first lens and said light source; and (e) a photodetection device coaxially aligned and positioned between said light source and said second lens at a point of optimum absorption of light energy which is reflected back from an object and through said first and second lens.

2. A coaxial reflex photoelectric scanner according to claim 1, wherein said lens is a fresnel lens.

3. A coaxial reflex photoelectric scanner according to claim 1, further comprising a heat sink mounted within said housing and thermally connected to said photoelectric light source to enable operation of said light source at increased light emitting levels.

4. A coaxial reflex photoelectric scanner according to claim 1, wherein said housing is comprised of means for adjusting the distance between said second lens and said photodetection device to maximize the absorption of reflected light energy received by said photodetection device.

5. A coaxial reflex photoelectric scanner according to claim 1, wherein said first lens is comprised of a molded polycarbonate plastic material, wherein said first lens also serves as a filter to pass infrared radiation while blocking visible light.

6. A coaxial reflex photoelectric scanner according to claim 4, wherein said adjusting means is comprised of:
(a) a first housing section having said photodetection device mounted therein; and
(b) a second housing section having said second lens mounted therein, said first and second housing sections having respective thread portions in mating engagement with one another, whereby as said first housing section is rotated with respect to said second housing section, the distance between said photodetection device and said second lens changes.